(12) United States Patent
Lin

(10) Patent No.: US 11,361,511 B2
(45) Date of Patent: Jun. 14, 2022

(54) METHOD, MIXED REALITY SYSTEM AND RECORDING MEDIUM FOR DETECTING REAL-WORLD LIGHT SOURCE IN MIXED REALITY

(71) Applicant: HTC Corporation, Taoyuan (TW)

(72) Inventor: Yi-Chen Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 131 days.

(21) Appl. No.: 16/744,181

(22) Filed: Jan. 16, 2020

(65) Prior Publication Data

US 2020/0242843 A1 Jul. 30, 2020

Related U.S. Application Data

(60) Provisional application No. 62/796,558, filed on Jan. 24, 2019.

(51) Int. Cl.
*G06T 19/00* (2011.01)
*G06K 9/62* (2022.01)
*G02B 30/33* (2020.01)
*G06T 15/50* (2011.01)
*G06F 3/01* (2006.01)
(Continued)

(52) U.S. Cl.
CPC ........ *G06T 19/006* (2013.01); *G02B 27/0172* (2013.01); *G02B 30/33* (2020.01); *G06F 3/011* (2013.01); *G06K 9/6223* (2013.01); *G06T 15/506* (2013.01); *G06V 20/20* (2022.01); *G06T 2215/16* (2013.01)

(58) Field of Classification Search
CPC . G06T 19/006; G06T 15/506; G06T 2215/16; G02B 30/33; G02B 27/0172; G06F 3/011; G06K 9/00671; G06K 9/6223
See application file for complete search history.

(56) References Cited

U.S. PATENT DOCUMENTS

| 5,546,139 A * | 8/1996 | Bacs, Jr. | H04N 9/3129 348/36 |
| 6,072,903 A * | 6/2000 | Maki | G06T 7/246 348/169 |

(Continued)

OTHER PUBLICATIONS

"Office Action of Taiwan Counterpart Application", dated Mar. 4, 2022, p. 1-p. 13.

*Primary Examiner* — Charles L Beard
(74) *Attorney, Agent, or Firm* — JCIPRNET

(57) ABSTRACT

A method, a mixed reality (MR) system, and a recording medium for detecting a real-world light source in MR are provided. The method is applicable to the MR system having a computing apparatus and a head-mounted display (HMD). In the method, a plurality of light regions of a plurality of continuous images is analyzed, and each of the light regions is projected according to a coordinate position of the HMD corresponding to the plurality of continuous images to generate three-dimensional vectors. Then, the three-dimensional vectors are clustered to predict a directional light in a current image. Finally, a plurality of intersection points between the three-dimensional vectors is calculated, and a point light in the current image is predicted according to the intersection points.

18 Claims, 6 Drawing Sheets

(51) Int. Cl.
*G02B 27/01* (2006.01)
*G06V 20/20* (2022.01)

(56) References Cited

U.S. PATENT DOCUMENTS

| | | | | |
|---|---|---|---|---|
| 6,624,812 | B1* | 9/2003 | Collodi | G06T 15/50 345/426 |
| 6,819,319 | B1* | 11/2004 | Fenney | G06T 15/50 345/426 |
| 6,819,421 | B1* | 11/2004 | Mead | G01N 15/1456 356/338 |
| 8,600,538 | B2* | 12/2013 | Holroyd | B29C 64/141 700/119 |
| 9,591,427 | B1* | 3/2017 | Lyren | H04S 7/301 |
| 9,606,020 | B2* | 3/2017 | Tamada | G01M 11/00 |
| 9,672,654 | B2* | 6/2017 | Shin | G06T 15/06 |
| 9,754,405 | B1* | 9/2017 | Young | G06T 17/005 |
| 9,916,517 | B2* | 3/2018 | Raghoebardajal | H04N 13/398 |
| 9,958,682 | B1* | 5/2018 | Moore | G02B 27/0172 |
| 10,121,282 | B2* | 11/2018 | Ahn | G06T 15/506 |
| 10,242,485 | B2* | 3/2019 | Karras | G06T 1/20 |
| 10,269,173 | B2* | 4/2019 | Ide | G06F 30/15 |
| 10,573,067 | B1* | 2/2020 | Naik | G06V 10/28 |
| 10,600,205 | B2* | 3/2020 | Lee | G06K 9/03 |
| 10,602,046 | B2* | 3/2020 | Pan | G06K 9/00355 |
| 10,636,200 | B2* | 4/2020 | Wu | G06T 15/60 |
| 10,678,397 | B2* | 6/2020 | Tsai | G06F 3/04815 |
| 10,771,773 | B2* | 9/2020 | Xiao | H04N 13/363 |
| 10,896,544 | B2* | 1/2021 | Yang | G06K 9/00671 |
| 10,976,809 | B2* | 4/2021 | Li | A63F 13/21 |
| 10,984,242 | B1* | 4/2021 | Atlas | H04W 4/029 |
| 11,215,711 | B2* | 1/2022 | Hilliges | G06T 15/00 |
| 11,245,825 | B2* | 2/2022 | Li | H04N 5/23229 |
| 2003/0025706 | A1* | 2/2003 | Ritter | G06T 15/506 345/582 |
| 2004/0056858 | A1* | 3/2004 | Ohba | G06T 15/02 345/419 |
| 2004/0061700 | A1* | 4/2004 | Shioya | G06T 15/50 345/426 |
| 2004/0070565 | A1* | 4/2004 | Nayar | G09G 3/003 345/156 |
| 2005/0069207 | A1* | 3/2005 | Zakrzewski | B64D 45/0053 382/218 |
| 2005/0073939 | A1* | 4/2005 | Sakaguchi | G06T 15/50 369/125 |
| 2005/0101857 | A1* | 5/2005 | Masutani | G06T 7/0012 600/410 |
| 2005/0248571 | A1* | 11/2005 | McTaggart | G06T 15/506 345/426 |
| 2006/0132486 | A1* | 6/2006 | Kim | G06T 15/506 345/420 |
| 2006/0182367 | A1* | 8/2006 | Moghaddam | G06K 9/4661 382/276 |
| 2007/0038944 | A1* | 2/2007 | Carignano | G06T 15/20 715/757 |
| 2007/0201029 | A1* | 8/2007 | Jinno | G01N 21/57 356/446 |
| 2007/0273686 | A1* | 11/2007 | Watanabe | G06T 15/506 345/419 |
| 2009/0046113 | A1* | 2/2009 | Murakami | G09G 3/006 345/690 |
| 2009/0080698 | A1* | 3/2009 | Mihara | G06F 16/7328 382/103 |
| 2009/0268965 | A1* | 10/2009 | Mita | G01B 11/25 382/190 |
| 2010/0085425 | A1* | 4/2010 | Tan | H04N 13/363 348/54 |
| 2010/0134495 | A1* | 6/2010 | Matsui | G06T 15/50 345/426 |
| 2010/0134688 | A1* | 6/2010 | Moriwake | G06T 7/80 348/586 |
| 2010/0283883 | A1* | 11/2010 | Sato | H04N 5/2256 348/E5.025 |
| 2010/0289888 | A1* | 11/2010 | Ogihara | H04N 5/2351 348/222.1 |
| 2011/0148904 | A1* | 6/2011 | Kotani | G09G 3/006 345/589 |
| 2011/0234631 | A1* | 9/2011 | Kim | G06T 15/60 345/632 |
| 2011/0301760 | A1* | 12/2011 | Shuster | G06F 16/00 700/264 |
| 2012/0099798 | A1* | 4/2012 | Saruta | G01B 11/002 382/203 |
| 2012/0300274 | A1* | 11/2012 | Lin | G02B 30/56 359/9 |
| 2013/0038696 | A1* | 2/2013 | Ding | H04N 13/271 348/47 |
| 2013/0329053 | A1* | 12/2013 | Jones | G02B 5/208 348/164 |
| 2014/0098086 | A1* | 4/2014 | Burley | G06T 15/06 345/419 |
| 2014/0270434 | A1* | 9/2014 | Gulaka | A61B 5/0037 382/128 |
| 2015/0135128 | A1* | 5/2015 | Ren | G06T 19/006 715/781 |
| 2015/0193973 | A1* | 7/2015 | Langguth | G06T 7/586 345/420 |
| 2015/0279113 | A1* | 10/2015 | Knorr | G06T 15/50 345/633 |
| 2015/0302658 | A1 | 10/2015 | O'Connor et al. | |
| 2015/0310635 | A1* | 10/2015 | Ouzts | G06T 1/0007 345/592 |
| 2015/0348314 | A1* | 12/2015 | Koguchi | G06T 15/506 345/420 |
| 2015/0363978 | A1* | 12/2015 | Maimone | G02B 27/0172 345/633 |
| 2015/0374210 | A1* | 12/2015 | Durr | A61B 1/07 600/111 |
| 2016/0012642 | A1* | 1/2016 | Lee | G06T 15/506 345/426 |
| 2016/0148419 | A1* | 5/2016 | Ahn | G06T 15/506 345/426 |
| 2016/0171753 | A1* | 6/2016 | Park | G06T 15/506 345/420 |
| 2016/0219272 | A1* | 7/2016 | Fujimaki | H04N 13/344 |
| 2016/0346882 | A1* | 12/2016 | Yamazaki | G01B 11/2513 |
| 2016/0371880 | A1* | 12/2016 | Ide | G06F 30/20 |
| 2017/0010459 | A1* | 1/2017 | Sawai | H04N 5/74 |
| 2017/0076429 | A1* | 3/2017 | Russell | G03B 37/04 |
| 2017/0084068 | A1* | 3/2017 | Son | G06K 9/00208 |
| 2017/0122725 | A1* | 5/2017 | Yeoh | H04N 13/398 |
| 2017/0124689 | A1* | 5/2017 | Doba | G06T 7/593 |
| 2017/0205291 | A1* | 7/2017 | Shimada | G01N 21/57 |
| 2017/0249779 | A1* | 8/2017 | Obert | G06T 15/06 |
| 2017/0261439 | A1* | 9/2017 | Komatsu | G01N 21/95 |
| 2017/0323471 | A1* | 11/2017 | Chien | G06T 15/60 |
| 2018/0005034 | A1* | 1/2018 | Kaehler | G06T 7/73 |
| 2018/0068462 | A1* | 3/2018 | Wakai | G01B 21/042 |
| 2018/0174354 | A1* | 6/2018 | Dufay | G06T 15/506 |
| 2018/0211440 | A1 | 7/2018 | Kunkel et al. | |
| 2018/0225865 | A1* | 8/2018 | Lecocq | G06T 15/506 |
| 2018/0253869 | A1* | 9/2018 | Yumer | G06N 3/0454 |
| 2018/0259616 | A1* | 9/2018 | Jo | G01S 17/89 |
| 2018/0302614 | A1* | 10/2018 | Toksvig | G06T 19/00 |
| 2018/0308249 | A1* | 10/2018 | Nash | G06T 7/33 |
| 2018/0308281 | A1* | 10/2018 | Okoyama | G06T 7/187 |
| 2018/0316912 | A1* | 11/2018 | Wakai | H04N 13/239 |
| 2018/0357794 | A1* | 12/2018 | Young | G06T 13/80 |
| 2019/0011621 | A1* | 1/2019 | Karafin | G02B 25/002 |
| 2019/0033989 | A1* | 1/2019 | Wang | G06F 3/0346 |
| 2019/0051045 | A1* | 2/2019 | Nishiyama | G06T 7/251 |
| 2019/0073820 | A1* | 3/2019 | Barron | G06T 15/506 |
| 2019/0080509 | A1* | 3/2019 | Bianco | G06T 15/506 |
| 2019/0138786 | A1* | 5/2019 | Trenholm | G06K 9/6255 |
| 2019/0139261 | A1* | 5/2019 | Wakai | G06T 7/80 |
| 2019/0175134 | A1* | 6/2019 | Kajiki | G06T 5/008 |
| 2019/0228568 | A1* | 7/2019 | Wu | G06T 15/60 |
| 2019/0266788 | A1* | 8/2019 | Huynh-Thu | G06T 15/506 |
| 2019/0287294 | A1* | 9/2019 | Liu | G06T 5/20 |
| 2019/0304071 | A1* | 10/2019 | Kitajima | G06T 7/593 |

(56) References Cited

U.S. PATENT DOCUMENTS

| | | | |
|---|---|---|---|
| 2019/0349575 A1* | 11/2019 | Knepper | G06F 1/1694 |
| 2019/0362150 A1* | 11/2019 | Wei | G06T 19/006 |
| 2019/0384406 A1* | 12/2019 | Smith | G06F 3/167 |
| 2019/0384407 A1* | 12/2019 | Smith | G06K 9/00389 |
| 2019/0393670 A1* | 12/2019 | Yufu | H04N 5/225 |
| 2020/0035014 A1* | 1/2020 | Pantaleoni | G06T 15/506 |
| 2020/0041261 A1* | 2/2020 | Bernstein | F21V 1/08 |
| 2020/0057346 A1* | 2/2020 | Zedlitz | G05B 19/048 |
| 2020/0064911 A1* | 2/2020 | Mine | G06F 3/012 |
| 2020/0074734 A1* | 3/2020 | Hamlin | G02B 27/0093 |
| 2020/0098099 A1* | 3/2020 | Miyamori | G06T 5/007 |
| 2020/0195818 A1* | 6/2020 | Li | H04N 5/23229 |
| 2020/0195900 A1* | 6/2020 | Sodhi | H04N 5/23299 |
| 2020/0226413 A1* | 7/2020 | Ye | G06K 9/6215 |
| 2020/0242335 A1* | 7/2020 | Eshima | G06K 9/209 |
| 2020/0244996 A1* | 7/2020 | Iyer | H04N 19/61 |
| 2020/0273240 A1* | 8/2020 | Anderegg | G06T 19/006 |
| 2020/0302675 A1* | 9/2020 | Story | G06T 15/06 |
| 2020/0312042 A1* | 10/2020 | Sardari | G06T 17/00 |
| 2020/0319341 A1* | 10/2020 | Ollila | G01S 17/89 |
| 2020/0367970 A1* | 11/2020 | Qiu | G16H 50/50 |
| 2020/0380762 A1* | 12/2020 | Karafin | G06T 17/20 |
| 2021/0003452 A1* | 1/2021 | Ashdown | H05B 45/24 |
| 2021/0004974 A1* | 1/2021 | Guizilini | G06K 9/00664 |
| 2021/0035356 A1* | 2/2021 | Castaneda | H04L 65/605 |
| 2021/0042992 A1* | 2/2021 | Newman | G06T 15/205 |
| 2021/0049806 A1* | 2/2021 | Boksansky | G06T 15/506 |
| 2021/0049807 A1* | 2/2021 | Wright | G06T 15/506 |
| 2021/0065440 A1* | 3/2021 | Sunkavalli | G06T 7/70 |
| 2021/0068233 A1* | 3/2021 | Takeuchi | G02B 3/00 |
| 2021/0132480 A1* | 5/2021 | Sinn | G03B 21/14 |
| 2021/0141076 A1* | 5/2021 | Ilic | G01S 13/536 |
| 2021/0185294 A1* | 6/2021 | Malaika | G06T 7/73 |
| 2021/0208402 A1* | 7/2021 | Rampal | G06K 9/0061 |
| 2021/0264764 A1* | 8/2021 | Glynn | G08B 25/016 |
| 2021/0358422 A1* | 11/2021 | Yu | G09G 5/10 |
| 2021/0407446 A1* | 12/2021 | Wang | G09G 3/3607 |

* cited by examiner

METHOD, MIXED REALITY SYSTEM AND RECORDING MEDIUM FOR DETECTING REAL-WORLD LIGHT SOURCE IN MIXED REALITY

CROSS-REFERENCE TO RELATED APPLICATION

This application claims the priority benefit of U.S. provisional application Ser. No. 62/796,558, filed on Jan. 24, 2019. The entirety of the above-mentioned patent application is hereby incorporated by reference herein and made a part of this specification.

BACKGROUND OF THE INVENTION

Field of the Invention

The disclosure relates to a mixed reality (MR) technology, and in particular, to a method, an MR system, and a recording medium for detecting a real-world light source in MR.

Description of Related Art

MR is a technology in which a virtual world is superimposed on or fused into the real world to create a mixed world in a three-dimensional space using a computer simulation technology. A virtual picture is displayed on a head-mounted display (HMD) worn by a user, and the user can simultaneously see coexisting real-world physical entity and digital virtual object, so that a mixed environment mainly based on vision and combined with perception of hearing and touch may be provided. A user experiencing the MR perceives as if being in the real world and can interact with a physical entity or a virtual object in the mixed environment.

A real-world physical entity and a virtual object coexist in a mixed environment. In order to render a virtual object matching the real world, real-world light data needs to be established during establishment of the mixed environment. Generally, real-world light data may be generated based on an average of image intensities of a current frame and an average of color temperatures of the current frame. However, in case of determining the light data based on the average of the intensities of the current frame and the average of the color temperatures, the virtual object receives a same light at any position in the mixed environment. Therefore, when the virtual object is close to the light source and receives a relatively strong light at one side, the light received by the virtual object cannot match an actual light received in the real world, and a shadow matching the actual light also cannot be generated. Therefore, the virtual object is unrealistic.

SUMMARY OF THE INVENTION

In view of the above, the invention provides a method, an MR system, and a recording medium for detecting a real-world light source in MR, to detect positions of a directional light and a point light in an MR space, so as to generate light data.

The invention provides a method for detecting a real-world light source in MR applicable to an MR system including a computing apparatus and an HMD. The HMD includes an image capturing apparatus, and the method includes the following steps: analyzing a plurality of light regions of a plurality of continuous images, and projecting each of the light regions according to a coordinate position of the HMD corresponding to the continuous images to generate three-dimensional vectors, where the continuous images include a current image; clustering the three-dimensional vectors to predict a directional light in the current image; and calculating a plurality of intersection points between the three-dimensional vectors, and predicting a point light in the current image according to the intersection points.

In an embodiment of the invention, the step of analyzing the light region of the continuous images includes: segmenting the continuous images according to brightnesses of the continuous images to generate a plurality of candidate regions; and selecting, as the light regions, the candidate regions of which an average brightness of pixels is greater than a brightness threshold.

In an embodiment of the invention, the step of projecting each of the light regions according to the coordinate position of the HMD corresponding to the continuous images to generate the three-dimensional vectors includes: projecting each of the light regions into a three-dimensional space according to the coordinate position of the HMD corresponding to the continuous images by using intrinsic parameters and a pose of the image capturing apparatus corresponding to the continuous images to obtain the three-dimensional vectors of the light regions corresponding to the HMD.

In an embodiment of the invention, the step of clustering the three-dimensional vectors to predict the directional light in the current image includes: clustering the three-dimensional vectors by using a clustering method to generate a plurality of light clusters; and determining the directional light from the light clusters according to confidence of each of the light clusters and a confidence threshold.

In an embodiment of the invention, the step of clustering the three-dimensional vectors using the clustering method includes: clustering the three-dimensional vectors of a direction vector.

In an embodiment of the invention, the clustering method includes K-means clustering and Mean-shift clustering.

In an embodiment of the invention, the continuous images include a previous image, and the step of calculating the intersection points between the three-dimensional vectors, and predicting the point light in the current image according to the intersection points includes: calculating intersection points between a plurality of first three-dimensional vectors corresponding to the current image and a plurality of second three-dimensional vectors corresponding to the previous image in the three-dimensional vectors to obtain a first intersection point sample; and clustering the first intersection point sample and a second intersection point sample which corresponds to the previous image to predict the point light in the current image.

In an embodiment of the invention, the step of calculating the intersection points between the first three-dimensional vectors corresponding to the current image and the second three-dimensional vectors corresponding to the previous image in the three-dimensional vectors to obtain the first intersection point sample includes: determining confidence of the first three-dimensional vectors according to the first three-dimensional vectors and light clusters corresponding to the first three-dimensional vectors; and selecting the first three-dimensional vectors according to the confidence and a confidence threshold, and calculating intersection points between the selected first three-dimensional vectors and the second three-dimensional vectors to obtain the first intersection point sample.

In an embodiment of the invention, the step of clustering the first intersection point sample and the second intersection point sample that is corresponding to the previous image to predict the point light in the current image further includes: determining persistence corresponding to each of the intersection points according to a duration for which the intersection points included in the first intersection point sample and the second intersection point sample exist in the continuous images; clustering the intersection points of which the corresponding persistence is greater than a persistence threshold to generate a plurality of intersection point clusters; and determining the point light according to the intersection point clusters.

An MR system of the invention includes an HMD, a storage apparatus, and a computing apparatus. The storage apparatus stores one or more instructions. The computing apparatus is connected to the HMD and the storage apparatus and is configured to execute the instructions to: analyze a plurality of light regions of a plurality of continuous images, and project each of the light regions according to a coordinate position of the HMD corresponding to the continuous images to generate a plurality of three-dimensional vectors, where the continuous images include a current image; cluster the three-dimensional vectors to predict a directional light in the current image; and calculate a plurality of intersection points between the three-dimensional vectors, and predict a point light in the current image according to the intersection points.

The invention further provides a non-transitory computer-readable recording medium configured to record programs, where the programs are loaded by a processor in a computing apparatus to perform the following steps: analyzing a plurality of light regions of a plurality of continuous images, and projecting each of the light regions according to a coordinate position of the HMD corresponding to the continuous images to generate three-dimensional vectors, where the continuous images include a current image; clustering the three-dimensional vectors to predict a directional light in the current image; and calculating a plurality of intersection points between the three-dimensional vectors, and predicting a point light in the current image according to the intersection points.

To make the features and advantages of the invention clear and easy to understand, the following gives a detailed description of embodiments with reference to accompanying drawings.

DESCRIPTION OF THE EMBODIMENTS

Figures 1, 2:
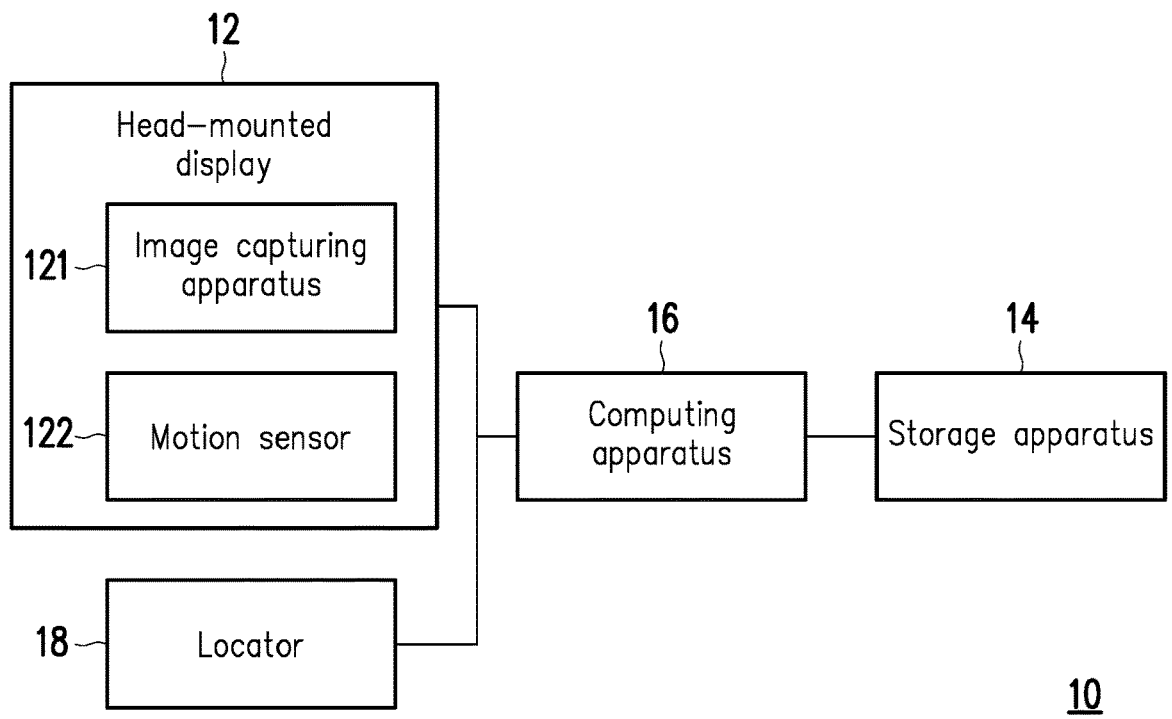
FIG. 1 is a block diagram of an MR system according to an embodiment of the invention.
FIG. 2 is a flowchart of a method for detecting a real-world light source in MR according to an embodiment of the invention.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

In the invention, a plurality of light regions in a plurality of continuous images is analyzed, and the light regions are projected according to a coordinate position of an HMD corresponding to the continuous images to generate three-dimensional vectors. During analysis of a light source, a directional light is predicted through clustering of the three-dimensional vectors using a clustering method, and a plurality of intersection points between the three-dimensional vectors is calculated to predict a point light. In this way, light data matching the real world can be established, so that a realistic virtual object can be obtained through virtual object rendering.

FIG. 1 is a block diagram of an MR system according to an embodiment of the invention. Referring to FIG. 1, an MR system 10 in the present embodiment includes an HMD 12, a storage apparatus 14, and a computing apparatus 16. Functions of the apparatuses are described as follows.

The HMD 12 is, for example, a liquid crystal display (LCD), a light-emitting diode (LED) display, or other displays of a suitable type. The HMD is manufactured in a form of a helmet or glasses, and therefore may be worn on a user's head. An image capturing apparatus 121 and a motion sensor 122 such as a gravity sensor or a gyroscope are further disposed on the HMD 12. The image capturing apparatus 121 may be any mono camera with a charge coupled device (CCD) lens, a complementary metal oxide semiconductor (CMOS) lens, or an infrared lens, or may be a stereo camera, but the invention is not limited thereto. There may be one or more image capturing apparatuses 121 disposed on the HMD 12. For example, the image capturing apparatus is disposed at the line of sight of a user when the user wears the HMD 12, so as to capture an image at the line of sight of the user. The motion sensor 122 may detect a rotation angle or a tilting angle of a user's head, and may feedback sensed data to the computing apparatus 16. The computing apparatus 16 may calculate a pose of the image capturing apparatus 121 accordingly.

The storage apparatus 14 may be any type of fixed or removable random access memory (RAM), read-only memory (ROM), flash memory, or similar elements or a combination thereof. In the present embodiment, the storage apparatus 14 is configured to store data, different preset thresholds, and programs executable by the computing apparatus 16. The programs include one or more instructions.

The computing apparatus 16 is, for example, a file server, a database server, an application server, a workstation, or an apparatus with a computing capability, such as a personal computer, including a processor. The processor is, for example, a central processing unit (CPU), or other programmable general-purpose or special-purpose microprocessors, a digital signal processor (DSP), a programmable controller, an application specific integrated circuit (ASIC), a programmable logic device (PLD), or other similar apparatuses or a combination of the apparatuses. The computing apparatus 16 is connected to the HMD 12 and the storage apparatus 14, and loads a program from the storage apparatus 14 to perform the method for detecting the real-world light source in the MR of the invention accordingly.

A locator 18 may be further disposed on the MR system 10 for locating a user wearing the HMD. The locator 18 is connected to the computing apparatus 16 and includes, for example, a laser or infrared transmitter and receiver, and may be configured to detect a distance between objects in a three-dimensional space. The locator 18 is combined with a plurality of calibrators disposed on an object (for example, the HMD 12), so that a position of the object in a three-dimensional space can be determined. The locator 18 may be placed at a corner of an activity space of the user. The locator can not only determine a position of the user in the three-dimensional space, but can also define a boundary of the activity space. A position of the boundary may be displayed on the HMD 12 when the user approaches the boundary, to prevent the user from walking out of the activity space or colliding with an object outside the activity space. The computing apparatus 16 may be connected to the locator 18 in a wire or wireless manner for data transmission.

It should be noted that, in an embodiment, the storage apparatus 14 and the computing apparatus 16 are separately disposed away from the HMD 12, and are connected to the HMD 12 in a wired or wireless manner for transmitting data. In the present embodiment, the storage apparatus 14 may be configured in the computing apparatus 16. In another embodiment, the storage apparatus 14 and the computing apparatus 16 may be integrated in the HMD 12, and are connected to the HMD 12 through a transmission line for transmitting data to each other. No limitation is imposed herein in the invention. Specific steps of the method for detecting the real-world light source in the MR of the invention are described below.

FIG. 2 is a flowchart of a method for detecting a real-world light source in MR according to an embodiment of the invention. Referring to FIG. 2, the method in the present embodiment of the invention is applicable to the MR system 10 in FIG. 1. The specific steps of the method for detecting the real-world light source in the MR in the present embodiment are described below using elements in the MR system 10.

First, the computing apparatus 16 analyzes a plurality of light regions of a plurality of continuous images, and projects each of the light regions according to a coordinate position of the HMD 12 corresponding to the continuous images to generate three-dimensional vectors, where the continuous images include a current image (step S202). In particular, the computing apparatus 16 controls the image capturing apparatus 121 to capture a plurality of continuous images and stores the continuous images into the storage apparatus 14. The stored continuous images include a current image and a previous image.

In the step of analyzing the light regions, the computing apparatus 16 segments the continuous images according to brightnesses of the continuous images to generate a plurality of candidate regions, and selected, as the light regions, candidate regions whose average brightness of pixels is greater than a brightness threshold. The step of analyzing the light region is described below in an example of segmenting a current image. For example, the computing apparatus 16 may perform image segmentation on the current image based on a brightness using a median cut algorithm. A method for segmenting the image based on the brightness is not limited herein in the invention.

Figure 4:
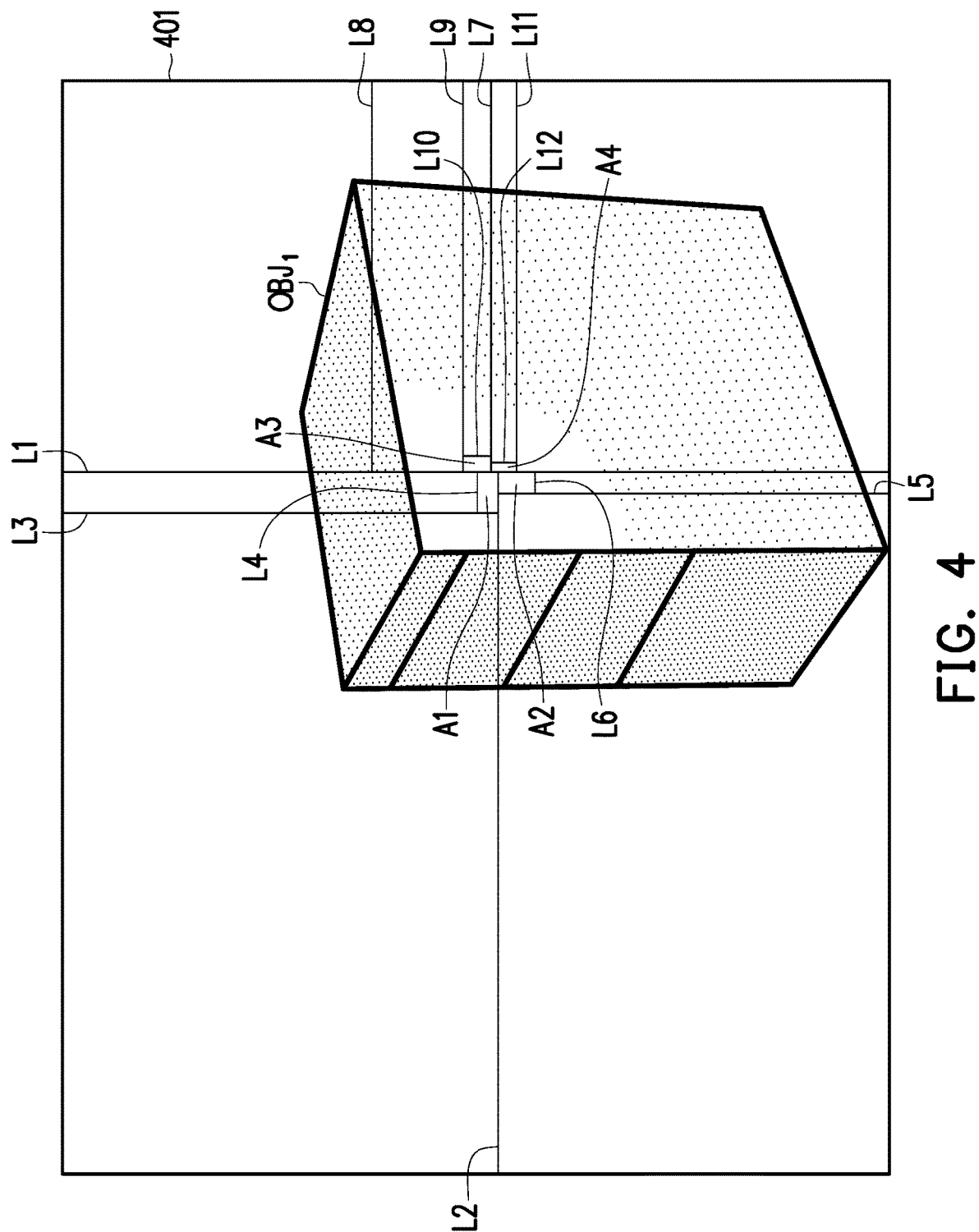
FIG. 4 shows an example of analyzing a two-dimensional light in an image according to an embodiment of the invention.

FIG. 4 is an example of analyzing a two-dimensional light in an image according to an embodiment of the invention. That a plurality of light regions of a current image 401 is analyzed using the median cut algorithm is used as an example. The computing apparatus 16 segments the current image 401 according to brightnesses of pixels included in the current image 401. Referring to FIG. 4, the current image 401 includes an $OBJ_1$. The computing apparatus 16 obtains the brightnesses of the pixels in the current image 401, and determines a segmenting line L1 that may be used to segment the current image 401 into two segmented regions with a same brightness according to a vertical line between a length side and an opposite side of the current image 401. For example, the segmenting line L1 in FIG. 4 is used to segment the current image 401 into two left and right segmented regions. Next, the computing apparatus 16 determines segmenting lines L2 and L7 that may be used to respectively segment the corresponding segmented regions into two segmented regions with a same brightness according to respective vertical lines between length sides and opposite sides of the two segmented regions. For example, the segmenting line L2 in FIG. 4 is used to segment a segmented region on a left side of the segmenting line L1 into two upper and lower segmented regions, and the segmenting line L7 is used to segment a segmented region on a right side of the segmenting line L1 into two segmented regions. If an iteration number is less than a preset number n, the computing apparatus 16 segments the segmented region into two segmented regions with a same brightness again. In the present embodiment, after the computing apparatus 16 segments the current image 401, a plurality of candidate regions may be generated according to the segmenting lines L1 to L12, and a candidate region whose average brightness of pixels is greater than the brightness threshold is selected as the light region. The average brightness of pixels is an average brightness of all pixels in a single candidate region. In the present embodiment, the selected candidate region is, for example, A1 to A4 in light regions in FIG. 4.

Next, in the step of projecting the light region to generate the three-dimensional vector, the computing apparatus 16 projects each of the light regions into a three-dimensional space according to the coordinate position of the HMD 12 corresponding to the continuous images using an intrinsic parameter and a pose of the image capturing apparatus 121 corresponding to the continuous images, to obtain a three-dimensional vector of each of the light regions corresponding to the HMD 12.

Figure 5:
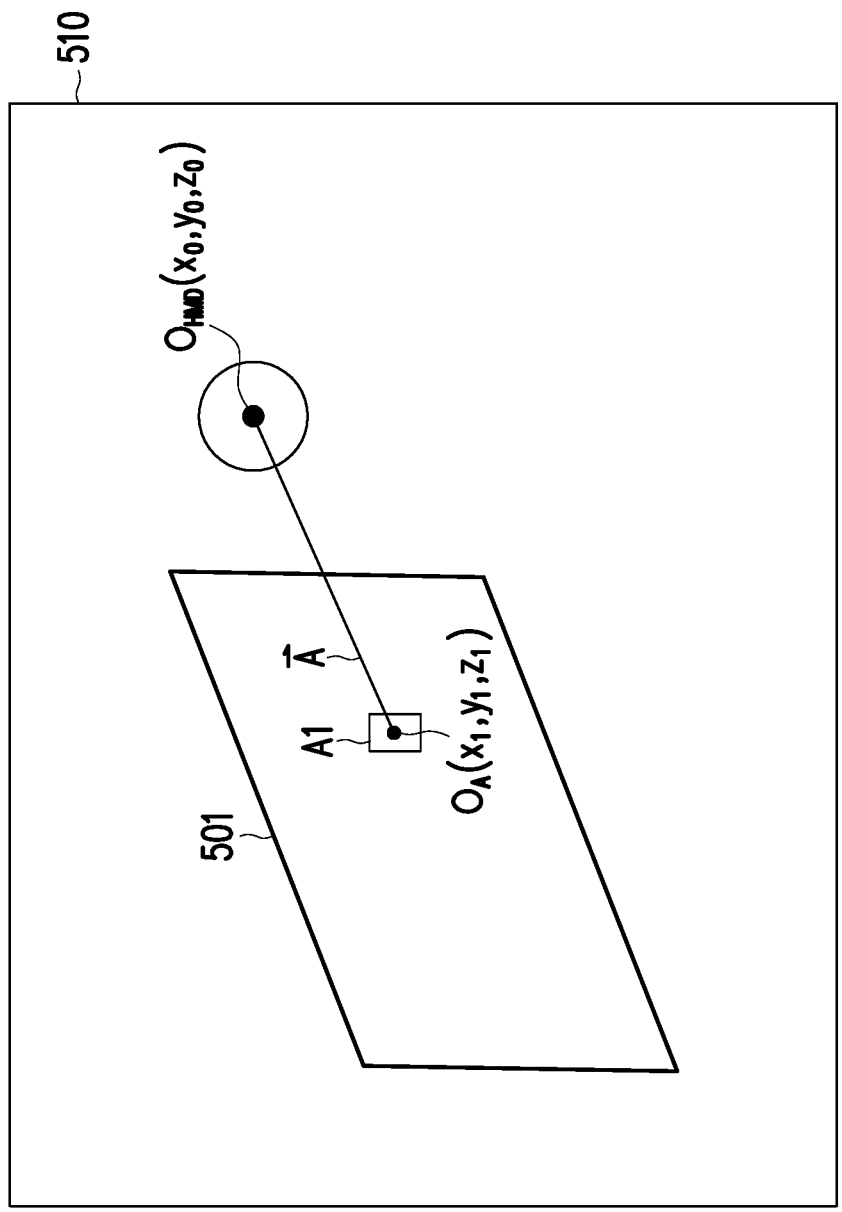
FIG. 5 shows an example of converting a two-dimensional light into a three-dimensional vector according to an embodiment of the invention.

Still in the example in FIG. 4, after the light regions A1 to A4 are analyzed from the current image 401, the computing apparatus 16 projects each of the light regions according to the coordinate position of the HMD 12 to generate a three-dimensional vector. FIG. 5 is an example of converting a two-dimensional light into a three-dimensional vector according to an embodiment of the invention. Referring to FIG. 5, a current image 501 represents a corresponding position of the current image 401 in FIG. 4 in a space 510. In the present embodiment, that a vector of the light region A1 corresponding to the HMD 12 is generated is used as an example. First, the computing apparatus 16 calculates a center (or centroid) $O_A$ of the light region A1 in the current image 401, and represents the light region A1 using a coordinate position $O_A$ ($x_1$, $y_1$) of the center. Then, the computing apparatus 16 projects the light region A1 into the three-dimensional space based on a coordinate position $O_{HMD}$ ($x_0$, $y_0$, $z_0$) of the HMD 12 using the intrinsic parameter and the pose (for example, a rotation or tilting angle) of the image capturing apparatus 121, to obtain a three-dimensional vector $\vec{A}$ of the light region A1 corresponding to the HMD. For projecting of the light region into the three-dimensional space using the intrinsic parameter and the pose of the image capturing apparatus, those skilled in the art should be able to obtain sufficient teaching based on their knowledge about coordinate projection, and therefore the descriptions thereof are omitted herein.

In an embodiment, the coordinate position $O_{HMD}$ ($x_0$, $y_0$, $z_0$) of the HMD 12 may be obtained based on a position of the user in the three-dimensional space detected using the locator 18. The locator 18 is disposed, for example, at two opposite corners of a room, so that a coordinate position of the user wearing the HMD 12 in the room can be determined, and the coordinate position is provided to the computing apparatus 16.

In another embodiment, the coordinate position of the HMD 12 may be calculated using a plurality of images captured by the image capturing apparatus 121. The computing apparatus 16 may first obtain original coordinates of the HMD 12. Displacement and deformation of a feature point in the captured image may be analyzed through image recognition to determine a change such as a rotation angle or a tilting angle and back and forth movement of the HMD 12, and the coordinate position of the HMD 12 in the room is calculated based on a change amount and the original coordinates.

In still another embodiment, the computing apparatus 16 may obtain the coordinate position of the HMD 12 in the room using the foregoing plurality of positioning technologies, and calculate the three-dimensional vector $\vec{A}$ of the light region A1 corresponding to the HMD accordingly. No limitation is imposed herein in the invention.

Figure 6:
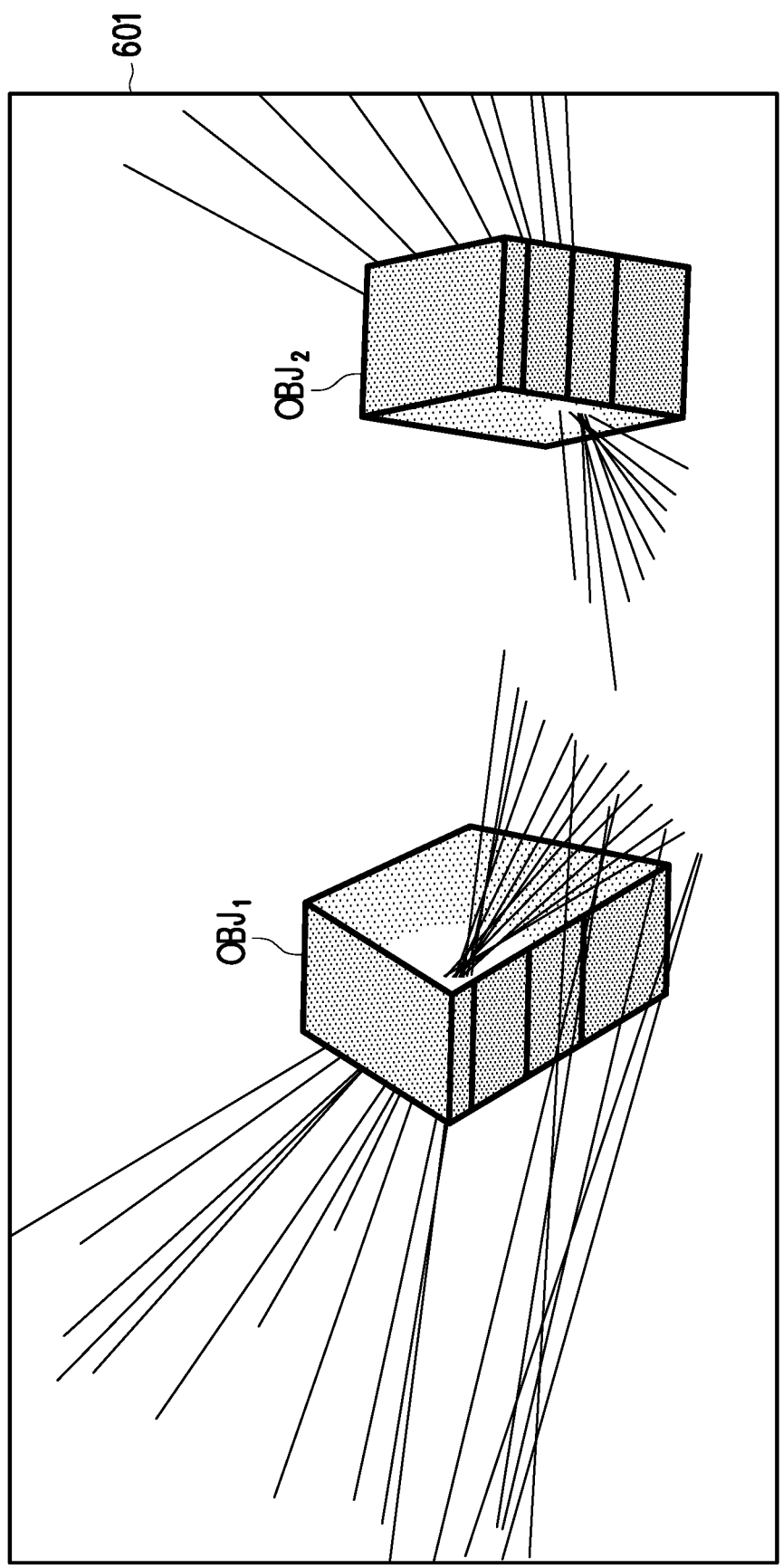
FIG. 6 shows an example of a plurality of three-dimensional vectors according to an embodiment of the invention.

After the three-dimensional vector is generated, the computing apparatus 16 stores the three-dimensional vector into a light database including a plurality of three-dimensional vectors analyzed from the previous image. FIG. 6 is an example of a plurality of three-dimensional vectors according to an embodiment of the invention. In the present embodiment, a plurality of three-dimensional vectors corresponding to the current image 401 and all three-dimensional vectors corresponding to the previous image may be displayed in a space 601, which may be shown in an example in FIG. 6. FIG. 6 includes an object $OBJ_1$, an object $OBJ_2$, and all three-dimensional vectors in a current light database.

Next, the computing apparatus 16 clusters the three-dimensional vectors to predict a directional light in the current image (step S204). A clustering method is, for example, K-means clustering, Mean-shift clustering method, or other clustering methods. No limitation is imposed herein in the invention. For clustering through K-means clustering, Mean-shift clustering, or other clustering methods, those skilled in the art should be able to obtain sufficient teaching based on their knowledge about a clustering method, and therefore the descriptions thereof are omitted herein.

General graphics content is controlled to include directional lights of a number less than four. Therefore, in an embodiment of the invention, a reducer may be used to reduce a number of directional light clusters during clustering. For example, a plurality of three-dimensional vectors may be clustered according to a strict criterion, and then a low-confidence light cluster may be filtered out or a plurality of light clusters may be combined into one to maintain a relatively small number of directional lights. A limiting principle of the reducer is, for example, that only one directional light emitting from a top and three directional lights emitting from a side are allowed.

In particular, the computing apparatus 16 clusters the three-dimensional vectors using a clustering method to generate a plurality of light clusters, and determines the directional light from the light clusters according to confidence of each light cluster and a confidence threshold. In particular, when clustering a plurality of three-dimensional vectors using a clustering method, the computing apparatus 16 may calculate a cluster vector corresponding to each of the light clusters. Next, the computing apparatus 16 calculates a dot product between each three-dimensional vector and a cluster vector of a light cluster to which the three-dimensional vector belongs, and sets 1-dot as the confidence of each three-dimensional vector. In other words, a smaller included angle between a three-dimensional vector and a clustering direction corresponding to a light cluster to which the three-dimensional vector belongs indicates higher corresponding confidence. On this basis, the computing apparatus 16 selects, as the directional light, a light cluster whose average confidence is greater than the confidence threshold to reduce directional lights.

Figure 7:
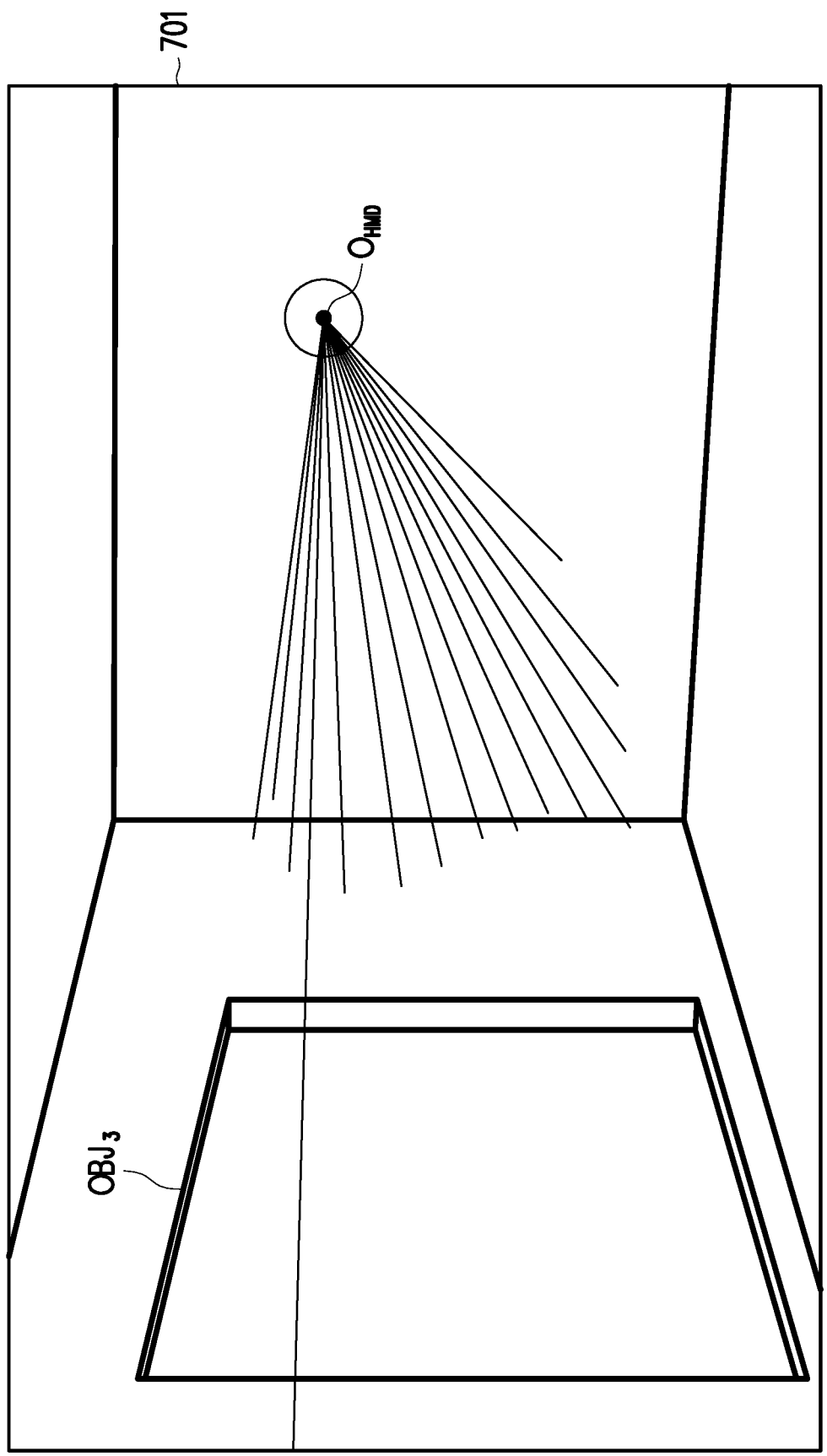
FIG. 7 shows an example of predicting a directional light according to an embodiment of the invention.

In another embodiment, the computing apparatus 16 may also cluster a three-dimensional vector of a direction vector using the clustering method. For example, FIG. 7 shows an example of predicting a directional light according to an embodiment of the invention. Referring to FIG. 7, a space 701 includes an object $OBJ_3$. The object $OBJ_3$ is, for example, a window that can provide a directional light. In general, a window can provide a side light. However, during projecting of a light region into a three-dimensional vector by the computing apparatus 16, since heights of some light regions are less than the coordinate position OHMS of the HMD 12, a three-dimensional vector with an upward component is generated after projection of the light regions with a height lower than a height of the HMD 12. Therefore, the computing apparatus 16 may cluster three-dimensional vectors with parallel direction vectors using the clustering method, to exclude the three-dimensional vectors with an upward component.

Finally, the computing apparatus 16 calculates a plurality of intersection points between the three-dimensional vectors, and predicts a point light in the current image according to the intersection points (step S206). The continuous images include a plurality of previous images. The computing apparatus 16 calculates intersection points between a plurality of first three-dimensional vectors corresponding to the current image and a plurality of second three-dimensional vectors corresponding to the previous image in the three-dimensional vectors to obtain a first intersection point sample. In addition, the computing apparatus 16 clusters the first intersection point sample and a second intersection point sample that is corresponding to the previous image to predict the point light in the current image. In particular, the computing apparatus 16 clusters intersection points included in the first intersection point sample and the second intersection point sample using the clustering method to generate a plurality of intersection point clusters. The computing apparatus 16 determines the point light based on the intersection point clusters. The clustering method is, for example, K-means clustering, Mean-shift clustering method, or other clustering methods. No limitation is imposed herein in the invention.

In particular, the computing apparatus 16 calculates the plurality of intersection points between the plurality of first three-dimensional vectors analyzed from the current image and the plurality of second three-dimensional vectors analyzed from the previous image stored in the light database to obtain the first intersection sample. The first intersection sample includes the plurality of intersection points between the plurality of first three-dimensional vectors analyzed from the current image and the plurality of second three-dimensional vectors analyzed from the previous image stored in the light database. Moreover, the computing apparatus 16 stores the first intersection point sample analyzed from the current image into an intersection point database including the second intersection point sample analyzed from the previous image. A method for analyzing the second intersection sample from the previous image is the same as the method for analyzing the first intersection point sample from the current image 401, and therefore the descriptions thereof are omitted herein. In the present embodiment, there may be a plurality of second intersection samples, and a number of second intersection samples depends on a number of previous images analyzed by the computing apparatus 16. Next, the computing apparatus 16 predicts a point light in the current image 401 according to the first intersection point sample and the second intersection point sample.

In addition, in the present embodiment of the invention, during clustering of intersection points included in each intersection point sample, samples exceeding a preset threshold corresponding to a screening condition are selected to be clustered according to the screening condition, to filter out some abnormal values. In the present embodiment, the screening condition is, for example, confidence of a three-dimensional vector and/or persistence of an intersection point. The computing apparatus 16 determines, according to the confidence, whether to retain the three-dimensional vector during calculation of the intersection point, or determines, according to the persistence, whether to retain the intersection point during clustering.

In an embodiment, the computing apparatus 16 determines confidence of each of the first three-dimensional vectors according to each of the first three-dimensional vectors corresponding to the current image and a light cluster corresponding to each of the first three-dimensional vectors. In addition, the computing apparatus 16 selects first three-dimensional vectors according to the confidence and a confidence threshold, and calculates intersection points between the selected first three-dimensional vectors and the second three-dimensional vectors corresponding to the previous image to obtain the first intersection point sample. In particular, when clustering a plurality of three-dimensional vectors using the clustering method (refer to the content in step S204), the computing apparatus 16 may determine a light cluster to which each of the first three-dimensional vectors analyzed from the current image belongs. Accordingly, the computing apparatus 16 calculates a cluster vector corresponding to the light cluster to which each of the first three-dimensional vectors belongs, calculates a dot product between each of the first three-dimensional vectors and the cluster vector of the light cluster to which each of the first three-dimensional vectors belongs, and sets 1-dot as confidence of each of the first three-dimensional vectors corresponding to the current image. The computing apparatus 16 may store the calculated confidence into the storage apparatus 14 for subsequent computation. In other words, a smaller included angle between a three-dimensional vector corresponding to the current image and a cluster vector corresponding to a light cluster to which the three-dimensional vector belongs indicates higher corresponding confidence. Accordingly, when computing the plurality of intersection points between the first three-dimensional vector corresponding to the current image and the plurality of second three-dimensional vectors analyzed from the previous image stored in the light database, the computing apparatus 16 first selects the first three-dimensional vectors based on the confidence and confidence threshold, and then calculates the intersection points between the selected first three-dimensional vectors and the second three-dimensional vectors. In an embodiment, the computing apparatus 16 selects a first three-dimensional vector whose confidence is greater than the confidence threshold to calculate an intersection point between the selected first three-dimensional vector and the second three-dimensional vector.

In addition, the computing apparatus 16 may calculate persistence corresponding to each intersection point. The computing apparatus 16 determines persistence corresponding to each of the first intersection points according to a duration for which the intersection points included in the first intersection point sample and the second intersection point sample exist in the continuous images (including the previous image and the current image), and determines, according to the persistence, whether to retain the intersection point during clustering. Next, the computing apparatus 16 clusters, using a clustering method, the intersection points whose corresponding persistence is greater than a persistence threshold to generate a plurality of intersection point clusters, and determines the point light according to the generated intersection point clusters.

In particular, the point light analyzed from the previous image has a corresponding intersection point cluster. The corresponding intersection point cluster includes a plurality of intersection points. When the intersection points are determined as intersection points corresponding to the point light, the computing apparatus 16 sets a setting value (that is, persistence) greater than the persistence threshold for the intersection points respectively, and stores the calculated persistence into the storage apparatus 14 for subsequent computation. If an intersection point does not exist in a point light predicted from a next image of the previous image, the computing apparatus 16 reduces persistence corresponding to the intersection point according to a preset value. During analysis of the current image, the computing apparatus 16 may obtain current persistence of each intersection point, and retain the intersection point during clustering when the current persistence of the intersection point is greater than the persistence threshold. In other words, the computing apparatus 16 clusters, through K-means clustering, a plurality of intersection points whose corresponding persistence is greater than the persistence threshold to generate a plurality of intersection point clusters.

In another embodiment, the computing apparatus 16 may also determine, according to the confidence, whether to retain the three-dimensional vector during computation of the intersection point, and determine, according to the persistence, whether to retain the intersection point during clustering. No limitation is imposed herein in the invention. The computing apparatus 16 may determine the plurality of generated intersection point clusters as the point light source after filtering based on the confidence and the persistence.

Figure 3:
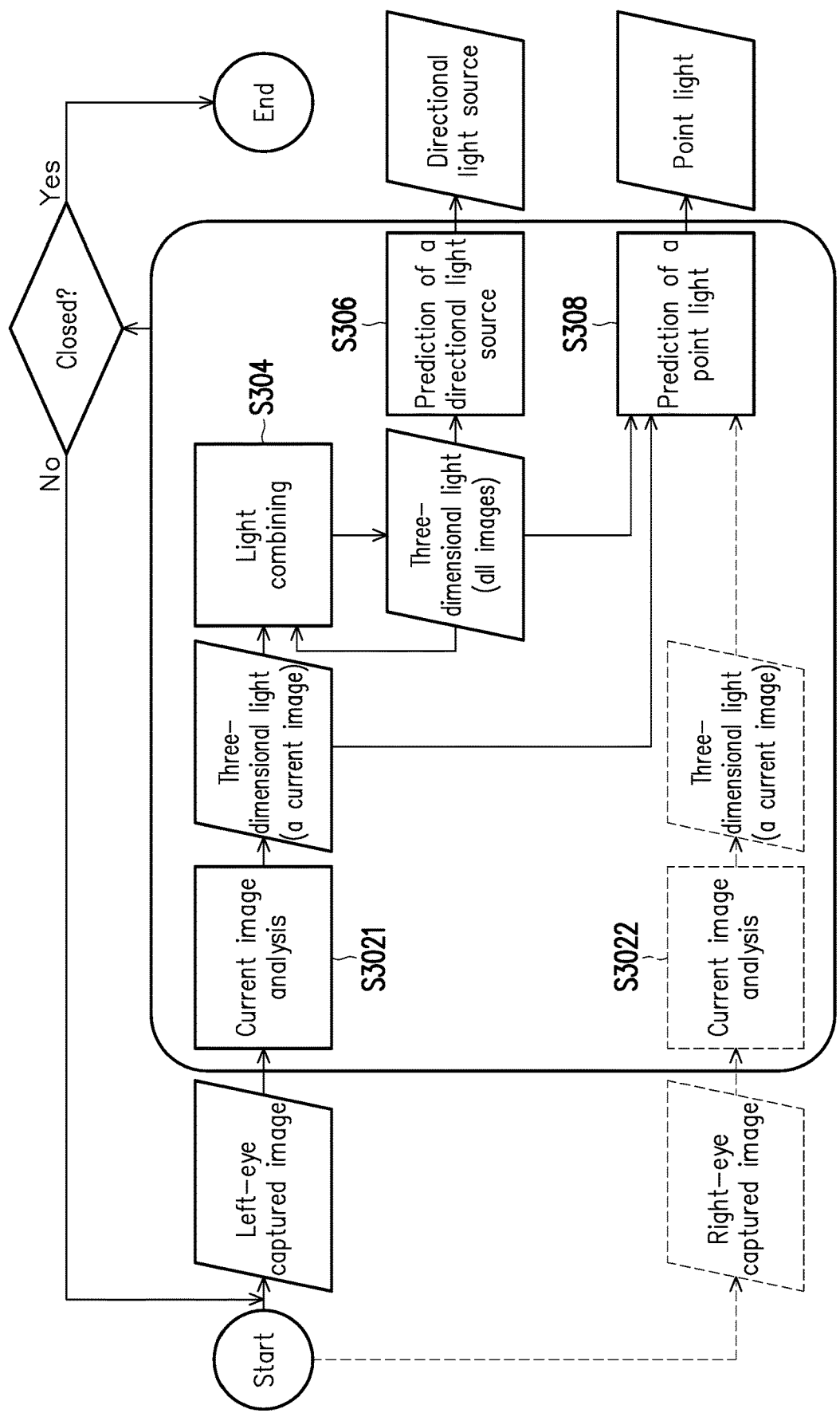
FIG. 3 is a flowchart of a method for detecting a real-world light source in MR according to an embodiment of the invention.

FIG. 3 is a flowchart of a method for detecting a real-world light source in MR according to an embodiment of the invention. Referring to FIG. 1 and FIG. 3 together, the method in the present embodiment is applicable to the foregoing MR system 10.

It should be noted that the HMD 12 may include a plurality of image capturing apparatuses 121. The present embodiment of the invention is described using continuous images captured by one of the image capturing apparatuses 121 as an example. The image capturing apparatus 121 described as an example is disposed at, for example, a position of a left eye. In other embodiments, the image capturing apparatus 121 may also be disposed at different positions on the HMD 12. No limitation is imposed herein in the invention.

First, the computing apparatus 16 controls the image capturing apparatus 121 to capture a left-eye captured image (that is, a current image). The computing apparatus 16 performs current image analysis on the left-eye captured image (step S3021) to generate three-dimensional lights (that is, a three-dimensional vector) corresponding to the left-eye captured image. Next, the computing apparatus 16 combines the lights (step S304). In the step of combining the lights, the computing apparatus 16 stores a plurality of three-dimensional vectors analyzed from the left-eye captured image into a light database including a plurality of three-dimensional vectors analyzed from a previous image.

Then the computing apparatus 16 predicts a directional light (step S306). The computing apparatus 16 predicts the directional light according to all three-dimensional vectors included in the light database. For a method for predicting the directional light, refer to the content in step S204, and the descriptions thereof are omitted herein. After the computing apparatus 16 clusters the three-dimensional vectors included in the light database, a light cluster shown in FIG. 7 may be generated.

Finally, the computing apparatus 16 predicts a point light (S308). The computing apparatus 16 predicts the point light according to a three-dimensional vector corresponding to the left-eye captured image and all of the three-dimensional vectors included in the light database. For a method for predicting the point light, refer to the content in step S206, and the descriptions thereof are omitted herein. In another embodiment, the computing apparatus 16 controls the image capturing apparatus 121 to capture a right-eye captured image, and performs current image analysis on the right-eye captured image (step S3022) to generate a three-dimensional light (that is, a three-dimensional vector) corresponding to the right-eye captured image. The computing apparatus 16 may predict the point light according to the three-dimensional light corresponding to the right-eye captured image, the three-dimensional vector corresponding to the left-eye captured image, and all of the three-dimensional vectors included in the light database herein.

Based on the above, after predicting the directional light and the point light, the computing apparatus 16 may render a virtual object using the directional light and the point light.

The invention further provides a non-transitory computer-readable recording medium configured to record a program to be loaded by a processor in a computing apparatus for performing the steps in the method for detecting the real-world light source in the MR. A computer program is composed of a plurality of program portions (for example, an organization chart program portion, an approval list program portion, a setup program portion, and a deployment program portion). After the program portion is loaded into the processor and executed, the steps of the method for detecting the real-world light source in the MR can be completed.

In summary, according to the method, the MR system, and the recording medium for detecting the real-world light source in the MR of invention, the light region may be projected according to the coordinate position of the HMD to generate the three-dimensional vector, so as to predict the directional light and the point light, thereby providing the directional light and the point light required for virtual object rendering. In this way, light data matching the real world can be established, so that a realistic virtual object can be obtained through virtual object rendering.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A method for detecting a real-world light source in mixed reality, applicable to a mixed reality system comprising a computing apparatus and a head-mounted display, wherein the head-mounted display comprises an image capturing apparatus, and the method comprises the following steps:

segmenting a plurality of continuous images according to brightnesses of the continuous images to generate a plurality of candidate regions; and selecting, as a plurality of light regions, the candidate regions of which an average brightness of pixels is greater than a brightness threshold within the mixed reality;

projecting each of the light regions according to a coordinate position of the head-mounted display corresponding to the continuous images to generate a plurality of three-dimensional vectors, wherein the continuous images comprise a current image;

clustering the three-dimensional vectors to predict a directional light in the current image; and calculating a plurality of intersection points between the three-dimensional vectors, and predicting a point light in the current image according to the intersection points within the mixed reality.

2. The method for detecting the real-world light source in the mixed reality according to claim 1, wherein the step of projecting each of the light regions according to the coordinate position of the head-mounted display corresponding to the continuous images to generate the three-dimensional vectors comprises:

projecting each of the light regions into a three-dimensional space according to the coordinate position of the head-mounted display corresponding to the continuous images by using intrinsic parameters and a pose of the image capturing apparatus corresponding to the continuous images, to obtain the three-dimensional vectors of the light regions corresponding to the head-mounted display.

3. The method for detecting the real-world light source in the mixed reality according to claim 1, wherein the step of clustering the three-dimensional vectors to predict the directional light in the current image comprises:

clustering the three-dimensional vectors by using a clustering method to generate a plurality of light clusters; and determining the directional light from the light clusters according to confidence of each of the light clusters and a confidence threshold.

4. The method for detecting the real-world light source in the mixed reality according to claim 3, wherein the step of clustering the three-dimensional vectors by using the clustering method comprises:

clustering the three-dimensional vectors of a direction vector.

5. The method for detecting the real-world light source in the mixed reality according to claim 3, wherein the clustering method comprises K-means clustering or Mean-shift clustering.

6. The method for detecting the real-world light source in the mixed reality according to claim 1, wherein the continuous images comprise a previous image, and the step of calculating the intersection points between the three-dimensional vectors, and predicting the point light in the current image according to the intersection points comprises:

calculating intersection points between a plurality of first three-dimensional vectors corresponding to the current image and a plurality of second three-dimensional vectors corresponding to the previous image in the three-dimensional vectors to obtain a first intersection point sample; and clustering the first intersection point sample and a second intersection point sample which corresponds to the previous image to predict the point light in the current image.

7. The method for detecting the real-world light source in the mixed reality according to claim 6, wherein the step of calculating the intersection points between the first three-dimensional vectors corresponding to the current image and the second three-dimensional vectors corresponding to the previous image in the three-dimensional vectors to obtain the first intersection point sample comprises:

determining confidence of the first three-dimensional vectors according to the first three-dimensional vectors and light clusters corresponding to the first three-dimensional vectors; and selecting the first three-dimensional vectors according to the confidence and a confidence threshold, and calculating intersection points between the selected first three-dimensional vectors and the second three-dimensional vectors to obtain the first intersection point sample.

8. The method for detecting the real-world light source in the mixed reality according to claim 6, wherein the step of clustering the first intersection point sample and the second intersection point sample which corresponds to the previous image to predict the point light in the current image further comprises:

determining persistence corresponding to each of the intersection points according to a duration for which the intersection points comprised in the first intersection point sample and the second intersection point sample exist in the continuous images;

clustering the intersection points of which the corresponding persistence is greater than a persistence threshold to generate a plurality of intersection point clusters; and determining the point light according to the intersection point clusters.

9. A mixed reality system, comprising:

a head-mounted display;

a storage apparatus storing one or more instructions; and a computing apparatus connected to the head-mounted display and the storage apparatus and configured to execute the instructions to:

segment a plurality of continuous images according to brightnesses of the continuous images to generate a plurality of candidate regions;

select, as a plurality of light regions, the candidate regions of which an average brightness of pixels is greater than a brightness threshold within the mixed reality;

project each of the light regions according to a coordinate position of the head-mounted display corresponding to the continuous images to generate a plurality of three-dimensional vectors, wherein the continuous images comprise a current image;

cluster the three-dimensional vectors to predict a directional light in the current image; and calculate a plurality of intersection points between the three-dimensional vectors, and predict a point light in the current image according to the intersection points within the mixed reality.

10. The mixed reality system according to claim 9, wherein the head-mounted display further comprises:

an image capturing apparatus connected to the computing apparatus, wherein the computing apparatus is configured to project each of the light regions into a three-dimensional space according to the coordinate position of the head-mounted display corresponding to the continuous images by using intrinsic parameters and a pose of the image capturing apparatus corresponding to the continuous images, to obtain the three-dimensional vectors of the light regions corresponding to the head-mounted display.

11. The mixed reality system according to claim 10, wherein the head-mounted display further comprises:
a locator connected to the computing apparatus and configured to determine the coordinate position of the head-mounted display.

12. The mixed reality system according to claim 9, wherein the computing apparatus is configured to: cluster the three-dimensional vectors by using a clustering method to generate a plurality of light clusters; and determine the directional light from the light clusters according to confidence of each of the light clusters and a confidence threshold.

13. The mixed reality system according to claim 9, wherein the computing apparatus is configured to cluster the three-dimensional vectors of a direction vector.

14. The mixed reality system according to claim 12, wherein the clustering method comprises K-means clustering or Mean-shift clustering.

15. The mixed reality system according to claim 9, wherein the continuous images comprise a previous image, and the computing apparatus is configured to: calculate intersection points between a plurality of first three-dimensional vectors corresponding to the current image and a plurality of second three-dimensional vectors corresponding to the previous image in the three-dimensional vectors to obtain a first intersection point sample; and cluster the first intersection point sample and a second intersection point sample which corresponds to the previous image to predict the point light in the current image.

16. The mixed reality system according to claim 15, wherein the computing apparatus is configured to: determine confidence of the first three-dimensional vectors according to the first three-dimensional vectors and light clusters corresponding to the first three-dimensional vectors; select the first three-dimensional vectors according to the confidence and a confidence threshold; and calculate intersection points between the selected first three-dimensional vectors and the second three-dimensional vectors to obtain the first intersection point sample.

17. The mixed reality system according to claim 15, wherein the computing apparatus is configured to: determine persistence corresponding to each of the intersection points according to a duration for which the intersection points comprised in the first intersection point sample and the second intersection point sample exist in the continuous images; cluster the intersection points of which the corresponding persistence is greater than a persistence threshold to generate a plurality of intersection point clusters; and determine the point light according to the intersection point clusters.

18. A method for detecting a real-world light source in mixed reality, applicable to a mixed reality system comprising a computing apparatus and a head-mounted display, wherein the head-mounted display comprises an image capturing apparatus, and the method comprises the following steps:
analyzing a plurality of light regions of a plurality of continuous images, and projecting each of the light regions according to a coordinate position of the head-mounted display corresponding to the continuous images to generate a plurality of three-dimensional vectors, wherein the continuous images comprise a current image and a previous image;

clustering the three-dimensional vectors to predict a directional light in the current image; and calculating a plurality of intersection points between the three-dimensional vectors, and predicting a point light in the current image according to the intersection points within the mixed reality;

wherein the step of calculating the intersection points between the three-dimensional vectors, and predicting the point light in the current image according to the intersection points within the mixed reality comprises:

calculating intersection points between a plurality of first three-dimensional vectors corresponding to the current image and a plurality of second three-dimensional vectors corresponding to the previous image in the three-dimensional vectors to obtain a first intersection point sample; and clustering the first intersection point sample and a second intersection point sample which corresponds to the previous image to predict the point light in the current image.

* * * * *